United States Patent [19]

Hendricks et al.

[11] 4,431,134
[45] Feb. 14, 1984

[54] DIGITAL THERMOSTAT WITH PROTECTION AGAINST POWER INTERRUPTION

[75] Inventors: Donald B. Hendricks, Bloomington; Austin R. Larson, Eagan, both of Minn.

[73] Assignee: MicroComm Corporation, Minneapolis, Minn.

[21] Appl. No.: 439,776

[22] Filed: Nov. 8, 1982

[51] Int. Cl.³ .......................... G11C 8/00; G06G 7/16
[52] U.S. Cl. ................................. 236/46 R; 364/844; 365/229
[58] Field of Search ............... 365/228, 229; 364/844; 307/39; 165/12; 236/46 R

[56] References Cited

U.S. PATENT DOCUMENTS

| | | | |
|---|---|---|---|
| 3,555,251 | 1/1971 | Shavit | 364/505 |
| 3,562,555 | 2/1971 | Ahrons | 365/229 X |
| 3,912,913 | 10/1975 | Bunting | 236/46 R |
| 4,001,557 | 1/1977 | Stephenson | 236/46 R |
| 4,071,745 | 1/1978 | Hall | 236/46 R |
| 4,079,366 | 3/1978 | Wong | 236/46 R |
| 4,109,704 | 8/1978 | Spethmann | 165/16 |
| 4,110,632 | 8/1978 | Wyland | 236/46 R |
| 4,114,807 | 9/1978 | Naseck et al. | 236/1 E |
| 4,122,893 | 10/1978 | Thompson | 165/16 |
| 4,136,392 | 1/1979 | Westphal | 364/492 |
| 4,162,036 | 7/1979 | Balduzzi | 236/47 |
| 4,191,328 | 3/1980 | Isaacs et al. | 236/46 R |
| 4,206,872 | 6/1980 | Levine | 236/46 R |
| 4,267,966 | 5/1981 | Neel et al. | 236/46 A |

Primary Examiner—William E. Wayner
Attorney, Agent, or Firm—Kinney, Lange, Braddock, Westman and Fairbairn

[57] ABSTRACT

A microcomputer controlled digital thermostat is powered by supply voltage derived from a large capacitance (e.g. 3.3 farad) voltage supply capacitor. The voltage supply capacitor is normally charged by an AC voltage which is derived from the furnace and which is rectified by a full wave rectifier bridge. Time and temperature data are stored in read/write RAM storage. The microcomputer controls operation of the thermostat as a function of sensed temperature and the stored time and temperature data. A voltage sensing circuit senses the supply voltage from the voltage supply capacitor and prevents the supply voltage from being provided to the microcomputer and other portions of the thermostat control circuitry when a prolonged interruption of AC power causes the supply voltage to decrease to a predetermined value. The supply voltage continues to be supplied to the read/write RAM to retain the stored time and temperature data. When AC power is restored, and the voltage supply capacitor is recharged, the digital thermostat is ready to resume operation without requiring the user to re-enter all of the stored time and temperature data. The capacitance of the voltage supply capacitor is sufficiently large to allow the capacitor to supply the current needed to retain the stored time and temperature data in the RAM through prolonged power interruptions without the need for a backup battery.

11 Claims, 3 Drawing Figures

DIGITAL THERMOSTAT WITH PROTECTION AGAINST POWER INTERRUPTION

BACKGROUND OF THE INVENTION

1. Field of the Invention

The present invention relates to a temperature control apparatus. In particular, the present invention relates to a microcomputer controlled digital thermostat.

2. Description of the Prior Art

With the dramatic increase in energy costs over the past decade, and the growing concern over the availability of fuels, increased attention has been focused upon energy conservation. The reduction of energy consumption in home heating and air-conditioning has been a topic of widespread interest.

Significant energy saving in home heating and air-conditioning can be achieved by the use of temperature setback at one or more periods during each day. For example, by decreasing the control temperature setting of a thermostat during sleeping hours and during times of day when no one is at home, significant savings in home heating costs can be achieved. Similar savings can be achieved by changes in the control temperature setting of a thermostat during times when air-conditioning is desired.

Clock thermostats which provide at least one setback period have been available for many years. Originally, these clock thermostats were of a mechanical or electromechanical type.

With the development of microprocessors and microcomputers, computerized thermostats which automatically provide two or more setback and setup temperature periods have been developed. In general, these computerized thermostats have included a user interface though which the user can enter selected time and temperature information. This information is stored by the microcomputer and used in controlling operation of a furnace and in some cases an air-conditioning compressor. In many cases, computerized thermostats allow the user to store multiple time and temperature settings for each day of the week.

U.S. Pat. Nos. 4,274,145 and 4,316,256, which are assigned to the same assignee as the present application, describe a highly advantageous electronic digital thermostat which utilizes a microcomputer control circuit. The thermostat described in these two patents controls operation of heating and air-conditioning as a function of sensed temperature and the stored time and temperature data which is entered by the user through a keyboard. The time and temperature data is stored within a read/write random access memory (RAM) within the microcomputer.

Microcomputer based electronic thermostats have, in the past, required a backup power supply, in the form of a battery, even when the primary source of power for the microcomputer and other electronic circuitry is derived from AC line power present in the furnace circuit. A backup power supply is necessary because the AC line power is subject to power interruptions and "brown out" conditions. In either case, a low voltage condition (caused by either a prolonged power failure or brown out which drains the battery) causes a loss of the time and temperature data stored in the read/write RAM. This means that when power is restored after a prolonged interruption, the user must re-enter all of the time and temperature data which has been lost due to the low voltage condition. Depending upon the digital thermostat and the desires of the user, it may be necessary to reprogram over one hundred time and temperature settings in the event of a power outage.

In general, digital thermostats having a battery backup power supply include a circuit which allows current to be drawn from the battery only in the event of a loss of AC power. This circuit prevents current from being drawn from the battery when there is a source of AC power available. This circuit, however, normally exhibits a time delay before the battery is connected into the circuit. This time delay basically represents the turn-on time of the transistors in the circuit. While the delay time is relatively short, the microcomputer can in some cases already be exposed to a low supply voltage condition before the battery is connected into the power supply circuit. This exposure to low supply voltage causes the microcomputer to "lock up" to an inactive condition.

Another disadvantage of a battery backup power supply in a digital thermostat is that the battery periodically requires replacement if power interruptions have occurred. The user may overlook the need for replacement of the battery until it is too late, and the time and temperature settings stored by the digital thermostat have been lost due to a power interruption. In addition, the replacement of batteries represent a continuing expense to the user.

There is a continued need for improved digital computerized thermostats which continue to operate reliably after a power interruption, and which avoid the inconvenience and expense of prior art backup power supply circuits.

SUMMARY OF THE INVENTION

The present invention is an improved temperature control apparatus which is primarily powered by AC power, and which is capable of resuming operation even after a prolonged interruption in AC power.

The apparatus of the present invention includes read/write storage means for storing time and temperature data; temperature sensing means for providing a temperature signal indicative of sensed temperature; and control circuit means for providing control signals for controlling temperature as a function of the temperature signal and the stored time and temperature data.

The read/write storage means and the control circuit means are powered by DC supply voltage derived from voltage supply capacitor means. The capacitor means is charged during normal operation of the apparatus by rectifier means, which is connected to a source of AC power.

The read/write storage means requires the presence of a supply voltage which is greater than a first predetermined value in order to retain the stored time and temperature data. When AC power is interrupted, the supply voltage from the voltage supply capacitor means begins to decrease due to current drawn by the read/write storage means and the control circuit means.

The apparatus of the present invention includes voltage sensing means for sensing the supply voltage and for preventing the control circuit means from drawing further current from the voltage supply capacitor means when an interruption of AC power has caused the supply voltage to decrease to a second predetermined value (which is higher than the first predetermined value). The control circuit means is disabled so that it does not cause further reductions of the supply voltage while the supply voltage continues to be supplied to the read/write storage means. As a result, the stored time and temperature data is retained even in the event of a prolonged interruption of AC power. The capacitance of the voltage supply capacitor means is sufficiently high that it allows current to be supplied to the read/write memory means for a prolonged period (preferably at least twenty-four hours) before the supply voltage decreases from the second predetermined value to the first predetermined value.

In preferred embodients of the present invention, the control circuit means includes a digital computer means, and also includes means for preventing the supply voltage from being provided to the digital computer means during periods of inactivity of the digital computer means. This reduces the current drawn from the voltage supply capacitor means by the digital means. During the time when the digital computer means is disabled, the supply voltage continues to be provided to the read/write storage means, so that the time and temperature data is retained intact.

DETAILED DESCRIPTION OF THE PREFERRED EMBODIMENTS

Figure 1:
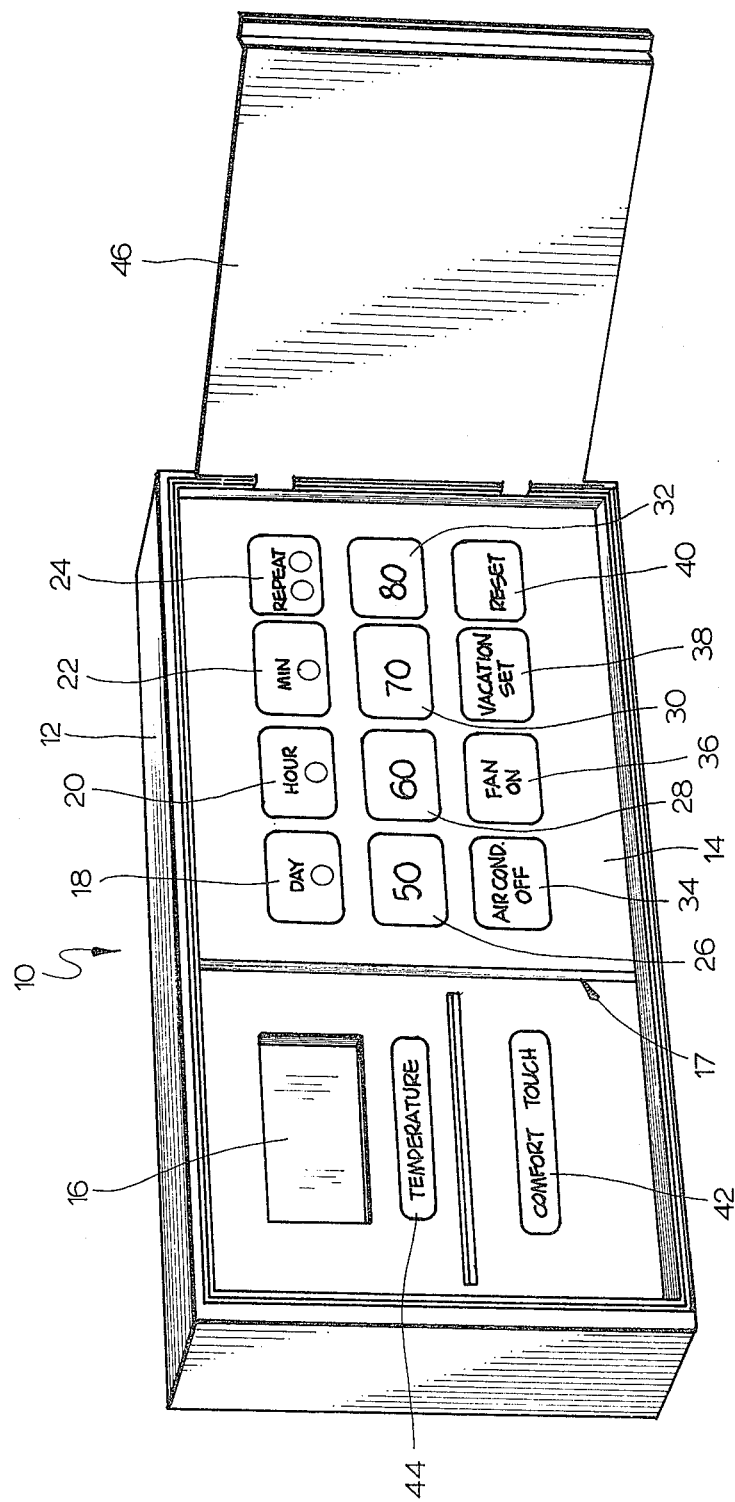
FIG. 1 is a perspective view of a preferred embodiment of the digital electronic thermostat of the present invention.

In FIG. 1, thermostat 10 of a preferred embodiment of the present invention includes generally rectangular housing 12 which is typically mounted on a wall within the house or building whose temperature is being controlled by thermostat 10. Front face plate 14 of thermostat 10 includes liquid crystal display 16 and a keyboard 17 formed of a plurality of membrane switches or keys, including DAY key 18, HOUR key 20, MIN key 22, REPEAT key 24, four temperature range keys 26, 28, 30 and 32, AIR COND OFF key 34, FAN ON key 36, VACATION SET key 38, RESET key 40, COMFORT TOUCH key 42, and TEMPERATURE key 44.

The membrane switches of keyboard 17 are used to both program thermostat 10 (i.e. enter and store time and temperature data) and for program recall, so that the user can view, through display 16, the stored time/temperature settings. Cover 46 is pivotally attached to housing 12 and, when closed, it covers keys 18–40. In FIG. 1, cover 46 is shown in its open position, which allows the user to make use of keys 18–40.

Figure 2A:
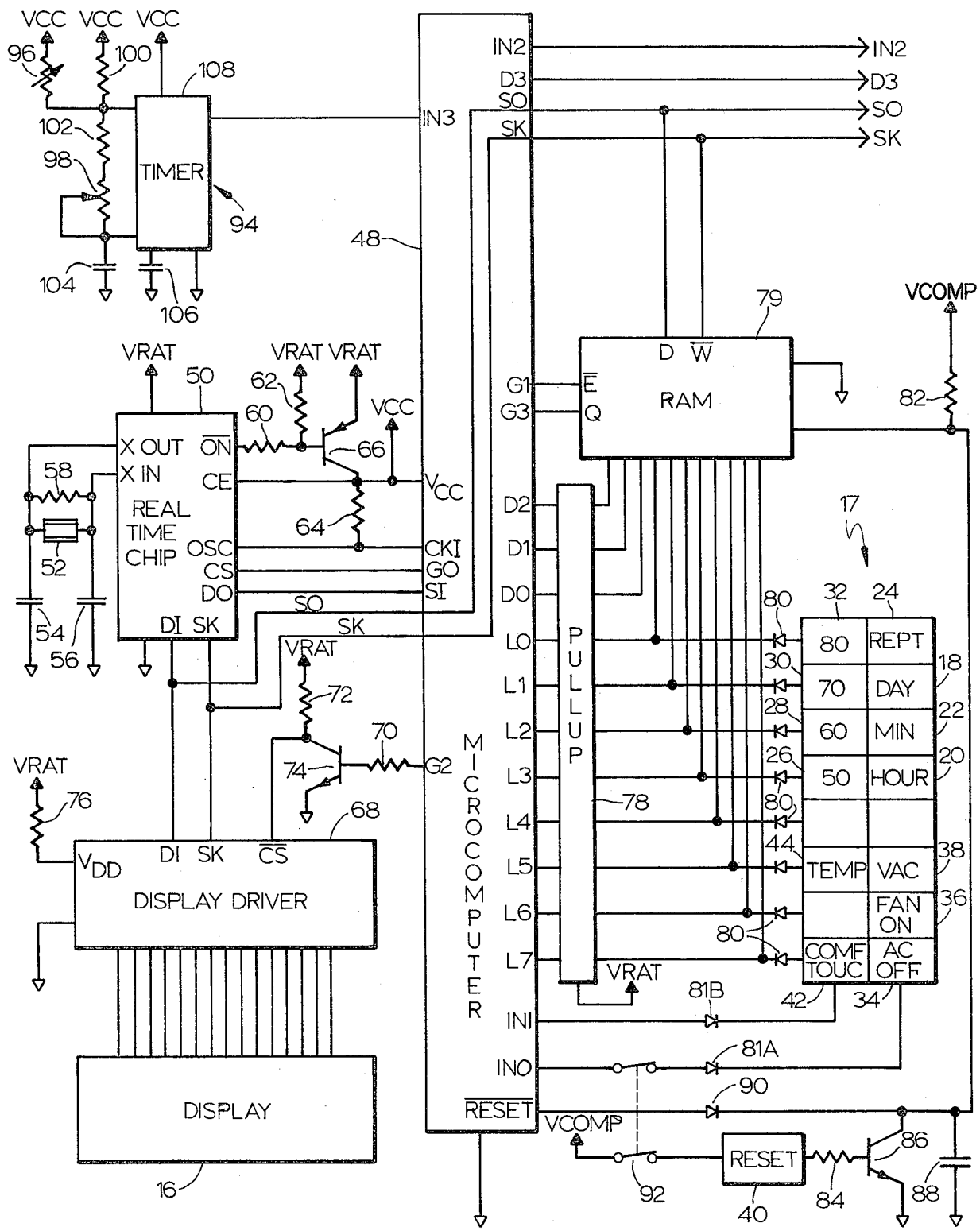
FIGS. 2A and 2B are an electrical schematic diagram of the digital electronic thermostat of FIG. 1.
Figure 2B:
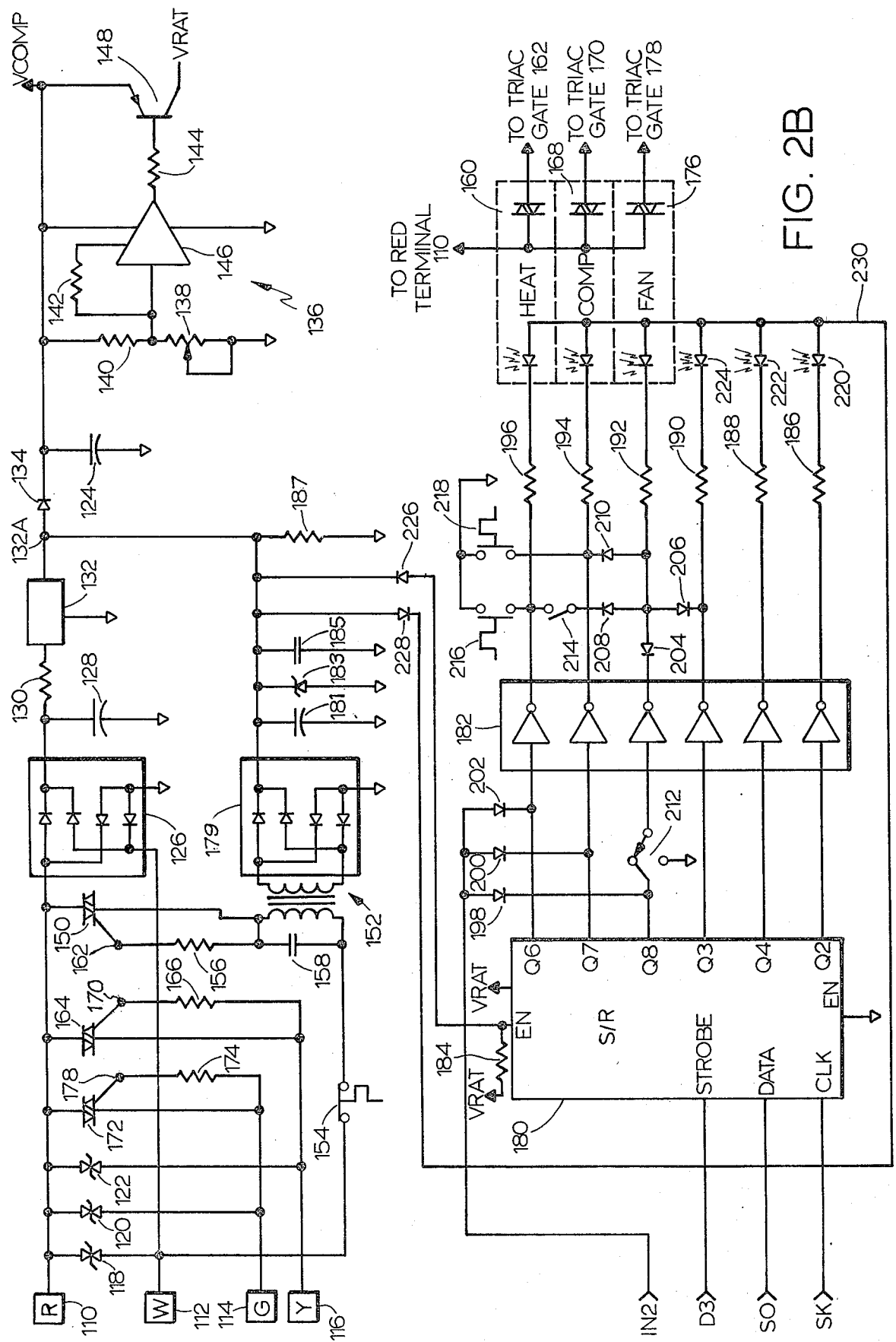

FIGS. 2A and 2B are a schematic diagram of a preferred embodiment of thermostat 10. The circuitry shown in FIGS. 2A and 2B is mounted within housing 12 of FIG. 1. As shown FIGS. 2A and 2B, thermostat 10 is capable of controlling a furnace, an air-conditioning compressor, and a blower fan.

As shown in FIG. 2A, microcomputer 48 controls and coordinates the operation of thermostat 10. In one preferred embodiment, microcomputer 48 is a 444L microcomputer which has on board a microprocessor, read only memory (ROM) program storage, random access memory (RAM) computational storage, and input/output interface circuitry. Microcomputer 48 communicates with other circuits of thermostat 10 primarily through the SO and SK lines. The SO line is a serial output data line, and the SK line is a clock line.

Real time chip 50 together with crystal 52, capacitors 54 and 56, resistors 58, 60, 62 and 64, and PNP transistor 66 provide control over the supply voltage VCC which powers microcomputer 48. In a preferred embodiment, real time chip 50 is a COP 498 integrated circuit which establishes a one second time base for microcomputer 48. At the beginning of each one second time interval, real time chip 50 turns on transistor 66, which permits supply voltage VRAT to be supplied to microcomputer 48 as supply voltage VCC. Whenever microcomputer 48 completes its tasks during the one second interval, it signals real time chip 50, and transfers data from its on-board RAM (e.g. the time of day) to real time chip 50 on the SO line. Real time chip 50 then turns off transistor 66. This causes supply voltage VCC to go to zero, thus shutting off microcomputer 48. During the time that transistor 66 is turned off, microcomputer 48 is inactive, and draws no current. At the beginning of the next one second interval, real time chip 50 turns on transistor 66 and transfers the data back to microcomputer 48 on serial input (SI) line.

Microcomputer 48 controls operation of display 16 through display driver 68. Data is loaded serially into display driver 68 from microcomputer 48 through the SO line. Operation of display driver 68 is selected by microcomputer 48 by means of resistors 70 and 72 and NPN transistor 74. Display driver 68 is powered from the VRAT supply voltage through resistor 76.

All of the keys of keyboard 17 except RESET key 40 are connected in an array of two rows and eight columns. Each one of the columns is connected through a diode 80 to one of the address lines L0–L7 of microcomputer 48. One row is connected through diode 81A to input IN0 of microcomputer 48, and the other row is connected through diode 88 to input IN1. By strobing its address lines L0–L7 and monitoring inputs IN0 and IN1, microcomputer 48 determines whether any one of the keys of the array is being depressed.

Thermostat 10 of FIG. 2A includes a read/write random access memory (RAM) 79 which stores time and temperature data and which is separate from microcomputer 48. RAM 79 stores the time and temperature data which is selected by the user through keyboard 17. RAM 79 shares address lines L0–L7 with keyboard 17.

In one preferred embodiment of the present invention, RAM 79 is a 6504 integrated circuit random access memory. About half of the 4K of storage in RAM 79 is used to store the user's time and temperature data as well as other flags and assorted information which is preferably retained even when microcomputer 48 is shut off by real time chip 50 or by an interruption in AC power. RAM 79 receives power through current limiting resistor 82, which is connected to supply voltage VCOMP.

A reset circuit which includes RESET key 40, resistor 84, NPN transistor 86, capacitor 88, diode 90 and switch 92 provides a means for resetting the thermostat circuitry by destroying the test pattern in the RAM 79. When RESET key 40 is actuated (and switch 92 is in a closed position), transistor 86 is turned on, thus shorting capacitor 88 and removing supply voltage from RAM 79. This also applies a reset signal to microcomputer 48 through diode 90.

When microcomputer 48 first initializes RAM 79, it writes in a 64-bit pattern. Each time microcomputer 48 is turned on by real time chip 50, it addresses RAM 79 and checks the 64-bit pattern. If RAM 79 fails the pattern test, this is an indication to microcomputer 48 that a reset has occurred while microcomputer 48 was turned off, and that microcomputer 48 must reinitialize RAM 79.

Switch 92 is preferably a two-pole, alternate action pushbutton switch. Normally switch 92 is maintained in an open position, which renders RESET key 40 inactive, and also renders inactive the keys 18, 20, 22, 24, 34, 36 and 38 contained in the lower row of the array. When switch 92 is open, the only keys which are active are COMFORT TOUCH key 42, TEMPERATURE key 44, and the four temperature range keys 26, 28, 30 and 32. This allows the user to prevent tampering with the time and temperature settings of thermostat 10 (particularly by children). Whenever programming is desired, switch 92 is switched to its closed position, which allows all of the keys of keyboard 17 to be active.

Microcomputer 48 provides temperature control signals as a function of the time and temperature data stored in RAM 79, and temperature sensed by temperature sensing circuit 94. In the embodiment shown in FIG. 2A, temperature sensing circuit 94 includes thermistor 96, potentiometer 98, resistor 100 and 102, capacitors 104 and 106, and timer 108. Thermistor 96 is exposed to the room environment through a hole (not shown in FIG. 1) in housing 12. The resistance of thermistor 96 varies as a function of sensed temperature.

In the preferred embodiment shown in FIG. 2A, timer 108 is a 555 type integrated circuit timer (such as a VCM7555). The output of timer 108 is a temperature signal which is supplied to an input IN3 of microcomputer 48. As the temperature increases, the frequency of the temperature signal from timer 108 increases. Conversely, as room temperature decreases, the frequency of the temperature signal decreases. Microcomputer 48 counts the pulses of the temperature signal from timer 108 over a time period and thereby converts the frequency of temperature signal of a digital temperature value.

Like microcomputer 48, temperature sensing circuit 94 is powered by supply voltage VCC, which is controlled by real time chip 50. Every time that microcomputer 48 is turned off by real time chip 50, timer 108 is also turned of. No current is consumed by temperature sensing circuit 94, therefore, during the time period when microcomputer 48 is disabled.

FIG. 2B shows the remaining circuitry of thermostat 10. Terminals 110, 112, 114 and 116 provide connection between thermostat 10 and the furnace, air-conditioning system, and blower fan controlled by thermostat 10.

Terminals 110 and 112 are connected in series with the valve relay or fan furnace relay of the furnace. In the embodiment shown in FIG. 2B, terminal 110 is color coaded red ("R") and terminal 112 is color coded white ("W"). Power for thermostat 10, in the form of 24-volt AC electrical power from the furnace electrical system, is derived from terminals 110 and 112.

Terminal 114, which is color coded green ("G"), is connected to a blower fan control. Terminal 116, which is color coded yellow ("Y"), is connected to an air-conditioning control.

Connected between terminals 110 and 112 is metal oxide varistor (MOV) 118, which is used to suppress electrical transients caused by relay turn-on or other electrical noise. Similarly, MOV 120 is connected between terminals 110 and 114, and MOV 122 is connected between terminals 110 and 116.

The input power from terminals 110 and 112 is used to charge voltage supply capacitor 24 by means of a charging circuit which includes full wave rectifier bridge 126, filter capacitor 128, current limiting resistor 130, voltage regulator 132 and diode 134. Supply voltage VCOMP is derived directly from the voltage across voltage supply capacitor 124.

In a preferred embodiment of the present invention, voltage supply capacitor 124 is a 3.3 farad capacitor, and the voltage across capacitor 124 is regulated by regulator 132 to be on the order of about 5.6 to 6.3 volts.

Voltage sensing circuit 136, which includes potentiometer 138, resistors 140, 142 and 144, comparator 146 and PNP transistor 148, monitors the VCOMP supply voltage supplied by capacitor 124. As long as VCOMP remains above a predetermined threshold (preferably about 4.5 volts), transistor 148 is turned on, thus providing supply voltage VRAT. When supply voltage VCOMP drops below 4.5 volts, which occurs when a prolonged power interruption has occurred which prevents charging current from being supplied to capacitor 124, comparator 146 changes states, thus turning off transistor 148 and causing supply voltage VRAT to go to zero.

Potentiometer 138 and resistor 140 of voltage sensing circuit 136 form a voltage divider which supplies to comparator 146 an input voltage which is derived from VCOMP. Comparator 146 is an integrated circuit comparator which has an internal reference voltage that it compares to the input voltage. When the input voltage falls below the internal reference voltage, the output of comparator 146 goes high. This turns off transistor 148.

Resistor 142 is a hysteresis feedback resistor. Once the input voltage has raised above the internal reference voltage, the feedback provided by resistor 142 pulls the input voltage still higher. This prevents oscillation when VCOMP is very close to the 4.5 volt threshold of voltage sensing circuit 136. Even though VCOMP may raise slightly when transistor 148 is initially turned off, the effect of hysteresis feedback resistor 142 is to force the input to comparator 146 to move down so that the fluctuation in VCOMP will not result in transistor 148 being turned back on.

The turning off of transistor 148 when VCOMP reaches the 4.5 volt threshold conserves the charge on capacitor 124 because all the circuitry of thermostat 10 is powered by supply voltage VRAT (except for RAM 79 which is powered by VCOMP). After transistor 148 is turned off, the only current drawn from supply capacitor 124 is that required to maintain the contents of RAM 79 and the comparator 146. This greatly extends the period over which the contents of RAM 79 can be retained in the event of a power interruption.

In preferred embodiments of the present invention, supply voltage capacitor 124 has a capacitance which is at least 1.0 farads and preferably between about 3.0 and 4.0 farads (e.g. 3.3 farads). The capacitance of capacitor 124 is sufficiently large to maintain all of the circuitry of thermostat 10 active for at least 10 minutes (and preferably 20 to 30 minutes) before VCOMP decays to the 4.5 volt threshold and transistor 148 is turned off. This means that the time of day, which is maintained by microcomputer 48, does not have to be reset by the user so long as the power interruption is relatively short (e.g. less than about 10 minutes).

The capacitance of supply capacitor 124 is also sufficiently large so that capacitor 124 can continue to supply the current necessary to maintain RAM 79 in an active condition for many days before VCOMP decays to a value which is insufficient to retain the contents of RAM 79. In the case of a catastrophic storm, power can be interrupted for as many as two to three days. When capacitor 124 has a value on the order of 3.3 farads, it is capable of keeping the contents of RAM 79 intact for at least that period of time.

In one preferred embodiment of the present invention, the current flow of charging current to capacitor 124 is limited by resistor 130 to about 50 milliamps. Under normal operating conditions, it takes about five minutes to bring the charge on capacitor 124 to a point where VCOMP is greater than the threshold of voltage sensing circuit 136, and transistor 148 is turned on.

Once the voltage on capacitor 124 has been established, capacitor 124 acts as a filter as well as the source of supply voltage for all of the circuitry of thermostat 10. Capacitor 124 acts as a filter which protects microcomputer 48 from exposure to a low voltage condition which would otherwise cause microcomputer 48 to lock up into an unknown nonoperational condition. In addition, since the voltage required to maintain the entire thermostat circuitry active is only on the order of 4.5 volts, while the normal AC voltage between terminals 110 and 112 is 24 volts, capacitor 124 allows thermostat 10 to operate reliably in low voltage "brown out" conditions.

Heating is controlled by thermostat 10 by means of heat control triac 150, which is connected in a series current path between red terminal 110 and white terminal 112. Also connected in series with the main current carrying electrodes of triac 150 is the primary winding of current transformer 152 and 90° F. thermal limit switch 154. The conductive state of triac 150 is controlled by a trigger circuit which includes resistor 156, capacitor 158 and opto-triac 160 (which is connected between red terminal 110 and gate terminal 162 of triac 150). When opto-triac 160 has a conductive state, triac 150 is turned on, which causes the furnace valve to be turned on.

Similarly, air-condioning control triac 164 is connected between red terminal 110 and yellow terminal 116. Triac 164 is controlled by a trigger circuit which includes resistor 166 and opto-triac 168 (which is connected between red terminal 110 and gate terminal 170 of triac 164). When triac 164 is triggered to a conductive state, it permits current flow between red terminal 110 and yellow terminal 116, thus turning on the air-conditioning compressor.

Fan control triac 172 is connected between red terminal 110 and green terminal 114. Triac 172 is controlled by the trigger circuit which includes resistor 174 and opto-triac 176 (which is connected between red terminal 110 and gate terminal 178 of triac 172). When fan control triac 172 is turned on, it permits current flow between red terminal 110 and green terminal 114, thus turning on a blower fan.

When heat control triac 150 is turned on, it establishes a relatively low resistance current path between terminals 110 and 112. As a result, only a relatively low voltage drop (between about 3 to 4 volts) exists between terminals 110 and 112 when triac 150 is turned on. In order to provide charging current to voltage supply capacitor 124 even when heat control triac 150 is turned on, a second charging circuit is provided. This second charging circuit includes current transformer 152, full wave rectifier bridge 179, filter capacitor 181, zener diode 183 (which clamps the voltage to 6.2 volts) transient suppression capacitor 185 and bleed-down resistor 187. This second charging current supply circuit is connected to output terminal 132A of voltage regulator 132, and then through diode 134 to supply voltage capacitor 124.

Microcomputer 48 controls the operation of opto-triacs 160, 168 and 176 through a circuit which includes shift register 180, open collector drivers 182, resistors 184, 186, 188, 190, 192, 194 and 196, diodes 198, 200, 202, 204, 206, 208 and 210, select switches 212 and 214, thermal limit switches 216 and 218, light emitting diodes 220, 222 and 224, and diodes 226 and 228.

Shift register 180 is a serial device which runs off the SO and SK lines for its data and clock signals from microcomputer 148. Whenever shift register 180 receives a strobe signal from line D3 of microcomputer 48, it transfers the information to output latches, which in turn supply inputs to drivers 182. The outputs of drivers 182 control opto-triacs 160, 168, and 170 and light-emitting diodes 220, 222 and 224. A high output from shift register 180 produces a low output from drivers 182 to turn on the selected opto-triac or light-emitting diode.

Light-emitting diode 220 is located behind the AIR-COND OFF key 34; light-emitting diode 222 is located behind VACATION SET key 38; and light-emitting diode 224 is located behind FAN ON key 36. When one of the light-emitting diodes 220, 222, 224 is turned on, it illuminates its respective key.

In a preferred embodiment of the present invention, microcomputer 48 is programmed to turn on fan opto-triac 176 when the temperature is 0.9° F. below the set point and a heating mode is selected, or when the temperature is 1° F. above set point and an air-conditioning mode is selected. This causes the already heated (or cooled) air within the house to be circulated, and can effect some energy saving. In some systems, however, this feature may not be desirable. Switch 212 is connected between shift register 180 and drivers 182 to prevent one of the outputs of shift reigster 180 from being provided to drivers 182, thus allowiing the user to select whether or not the feature of air recirculation under microcomputer control is desired.

Diode 206 causes fan opto-triac 176 to be turned on whenever fan LED 224 is turned on. Diode 208 causes fan opto-triac 176 to be turned on whenever heat opto-triac 160 is turned on (provided switch 214 is closed). Diode 210 causes fan opto-triac 176 to be turned on when air-conditioner opto-triac 168 is turned on.

Thermal limit switch 216 closes when temperature drops below 50° F. and turns on heat opto-triac 160. This causes heat control triac 150 to be turned on, even if microcomputer 48 does not call for heat.

Thermal limit switch 218 closes when temperature rises above 99° F. When thermal limit switch 218 closes, air-conditioning opto-triac 168 is turned on, thus triggering air-conditioning control triac 164.

Diode 226 is connected between the enable input of shift register 180 and the output terminal 132A of voltage regulator 132. Whenever an interruption in AC power occurs which causes the voltage at terminal 132A to drop, diode 226 removes the enable from shift register 180. This shuts off the output of shift register 180 and thus causes all of the opto-triacs to turn off.

Diode 228 is connected between terminal 132A and terminal 230 to provide power to opto-triacs 160, 168, 176, drivers 182, and light-emitting diodes 220, 222 and 224. Power is removed, therefore, whenever an interruption in AC power occurs which causes the voltage at terminal 132A to drop.

In conclusion, the thermostat 10 of the present invention avoids the need for a battery backup power source as required by other digital electronic thermostats. This results in several important advantages.

First, the present invention does not require replacement of batteries, and thus ultimately is more convenient and less expensive than if a battery backup were provided.

Second, voltage supply capacitor 124 can be charged and drained without affecting its electrical characteristics. This is unlike the properties of typical batteries.

Third, the present invention protects microcomputer 48 from exposure to a low voltage condition. With the prior art battery backup circuits, the delay time in operation can cause the microcomputer to be exposed briefly to a low voltage condition before the backup batter is switched into the circuit. If this occurs, the microcomputer will lock up into an unknown inactive state, despite the presence of backup power.

Fourth, the present invention is capable of providing very long term storage of the time and temperature settings despite a prolonged power interruption of "brown out". By turning off all circuitry which draws current from supply voltage capacitor 124 except RAM 79 once VCOMP drops to a threshold value (e.g. 4.5 volts), the time over which time and temperature data can be retained is greatly enhanced.

Although the present invention has been described with reference to preferred embodiments, workers skilled in the art will recognize that changes may be made in form and detail without departing from the spirit and scope of the invention.

What is claimed is:

1. A temperature control apparatus comprising:
    terminal means for connection to a source of AC power;
    rectifier means connected to the terminal means for rectifying the AC power to produce a DC charging current;
    a voltage supply terminal;
    voltage supply capacitor means for providing a DC supply voltage at the voltage supply terminal, the voltage supply capacitor means being charged by the DC charging current;
    read/write storage means connected to the voltage supply terminal and powered solely by the DC supply voltage for storing time and temperature data, the read/write storage means being capable of retaining the time and temperature data so long as the DC supply voltage at the voltage supply terminal exceeds a first predetermined value;
    temperature sensing means for sensing temperature;
    control circuit means powered solely by the DC supply voltage for providiing temperature control signals as a function of the sensed temperature and the stored time and temperature data;
    switching means connected between the voltage supply terminal and the control circuit means for supplying the DC supply voltage to the control circuit means to power the control circuit means when in a first state and for preventing the control circuit means from receiving the DC supply voltage when in a second state, the switching means having the first and second states as a function of a power control signal; and
    voltage sensing means for sensing the DC supply voltage of the voltage supply terminal and providing the power control signal as a function of the sensed DC supply voltage, the power control signal causing the switching means to have the second state when the DC supply voltage is less than a second, higher predetermined value.

2. The temperature control apparatus of claim 1 wherein the voltage supply capacitor means has a capacitance which is sufficiently high to allow current to be supplied from the voltage supply capacitor means to the read/write memory means to retain the time and temperature data for a period of at least twenty-four hours before the DC supply voltage at the voltage supply terminal decreases from the second predetermined value to the first predetermined value.

3. The temperature control aparatus of claim 2 wherein the capacitance of the voltage supply capacitor means is greater than 1 farad.

4. The temperature control apparatus of claim 3 wherein the capacitance of the voltage supply capacitor means is between about 3 farad and about 4 farad.

5. The temperature control apparatus of claim 1 wherein the temperature sensing means is powered by the DC supply voltage through the switching means and produces a temperature signal indicative of the sensed temperature, and wherein the control circuit means receives the temperature signal and provides the temperature control signals as a function of the temperature signal.

6. The temperature control apparatus of claim 5 wherein the control circuit means comprises:
    programmed computer means for providing the temperature control signals as a function of a stored program, the temperature signal, and the stored time and temperature data; and
    real time circuit means connected between the switching means and the computer means for disconnecting the computer means from the DC supply voltage during periods of inactivity of the computer means.

7. The temperature control apparatus of claim 6 wherin the computer means signals the real time circuit means each time that the computer means is about to enter a period of inactivity, and wherein the real time circuit means disconnects the computer means from the DC supply voltage for a selected time interval in response thereto.

8. The temperature control apparatus of claim 6 wherein the real time circuit means is also connected between the switching means and the temperature sensing means and disconnects the temperature sensing means from the DC supply voltage during periods of inactivity of the computer means.

9. A temperature control apparatus comprising:
    terminal means for connection to a source of AC power;
    rectifier means connected to the terminal means for rectifying the AC power to produce a DC charging current;
    voltage supply capacitor means for providing a DC supply voltage, the voltage supply capacitor means being charged by the DC charging current;
    read/write storage means being powered by the DC supply voltage for storing time and temperature data, the read/write storage means being capable of retaining the time and temperature data so long as the DC supply voltage exceeds a first predetermined value;

temperature sensing means powered by the DC supply voltage for sensing temperature and providing a temperature signal indicative of sensed temperature;

control circuit means powered by the DC supply voltage for providing temperature control signals as a function of the temperature signal and the stored time and temperature data; wherein the control circuit means comprises:

programmed computer means for providing the temperature control signals as a function of a stored program, the temperature signal, and the stored time and temperature data; and real time circuit means for disconnecting the computer means from the DC supply voltage during periods of inactivity of the computer means; and voltage sensing means for sensing the DC supply voltage, the voltage sensing means disconnecting the control circuit means from the DC supply voltage when the DC supply voltage is less than a second, higher predetermined value.

10. The temperature control apparatus of claim 9 wherein the computer means signals the real time circuit means each time that the computer means is about to enter a period of inactivity, and wherein the real time circuit means disconnects the computer means from the DC supply voltage for a selected time interval in response thereto.

11. The temperature control apparatus of claim 9 wherein the real time circuit means also disconnects the temperature sensing means from the DC supply voltage during periods of inactivity of the computer means.

* * * * *